June 27, 1967 C. F. HEALD 3,328,529

PHASE SHIFTING CIRCUIT FOR FM STEREO RECEIVER

Filed Aug. 31, 1964

Carl F. Heald
INVENTOR.

BY Richard E. Bee

ATTORNEY

United States Patent Office 3,328,529
Patented June 27, 1967

3,328,529
PHASE SHIFTING CIRCUIT FOR FM STEREO RECEIVER

Carl F. Heald, St. Joseph, Mich., assignor to Heath Company, St. Joseph, Mich., a corporation of Delaware
Filed Aug. 31, 1964, Ser. No. 393,105
3 Claims. (Cl. 179—15)

Figures 1, 2:
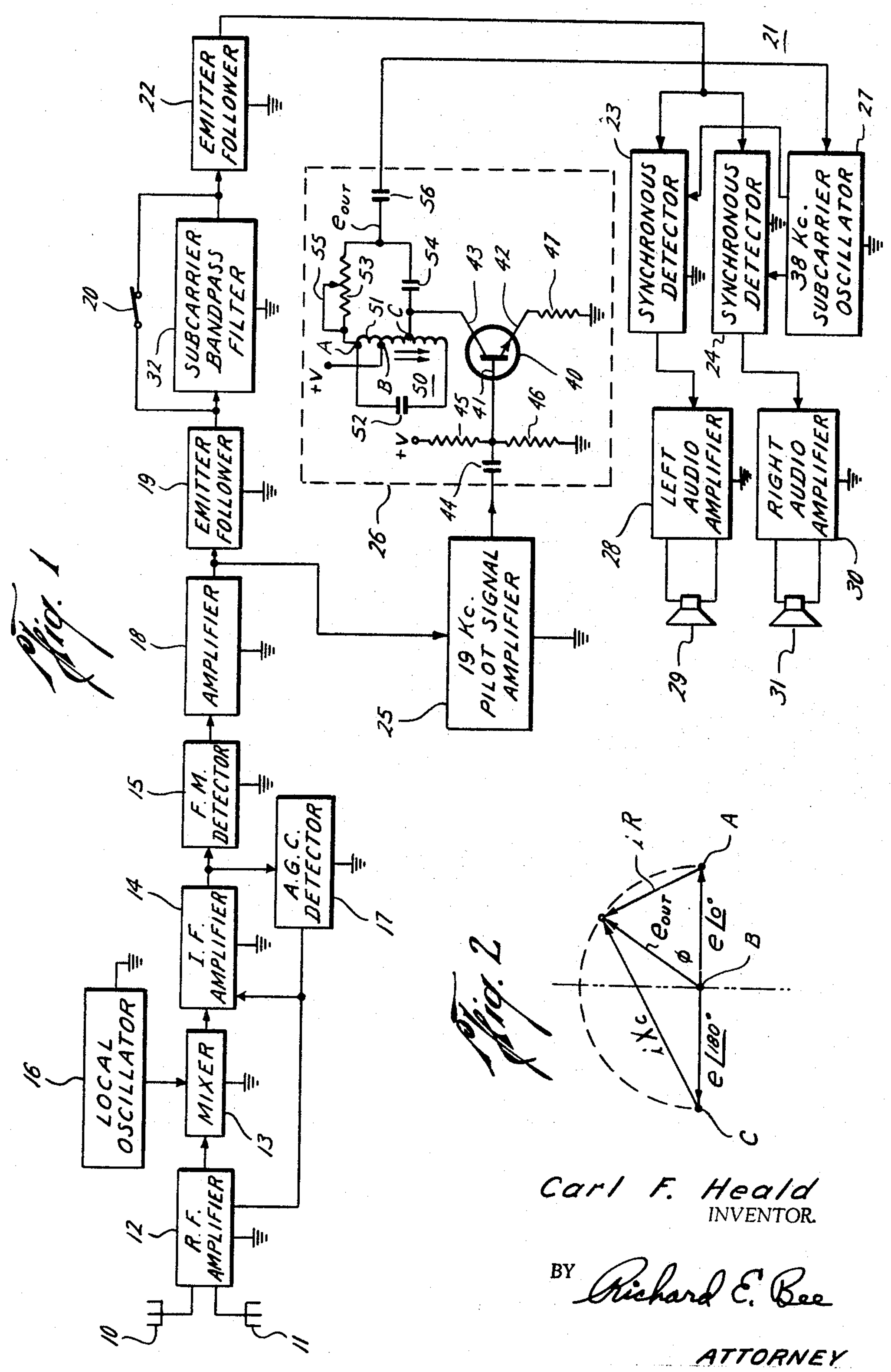

This invention relates to phase shifting circuits for radio-type receivers for receiving transmitted signals which are, at least in part, of the suppressed-carrier type. The present invention is particularly useful in frequency-modulation (FM) stereo multiplex receivers.

In the case of present-day FM stereo signal transmission, part of the audio information is transmitted in the form of modulation components of a suppressed-carrier subcarrier signal. In order to recover this audio information at the receiver, it is necessary to combine the received subcarrier components with a locally-generated subcarrier-frequency carrier signal having the proper phase. To this end, a synchronizing signal or pilot signal is also transmitted to the receiver for purposes of synchronizing the phase of the locally-generated subcarrier-frequency carrier signal. Nevertheless, various factors exist which may cause the reinserted subcarrier carrier to have an incorrect phase relative to the subcarrier modulation components. For one thing, the pilot signal which is used to synchronize or generate the local subcarrier carrier passes in part through different circuits from the subcarrier modulation components. This may introduce relative phase shifts. Also, and perhaps more bothersome, different transmitting stations sometimes transmit the pilot signal at different phase angles.

It is an object of the invention, therefore, to provide a new and improved phase shifting circuit for an FM stereo receiver for enabling easy adjustment of the phase of the locally-generated reinserted subcarrier signal with a minimum of adverse effect on the operation of any of the circuits.

It is another object of the invention to provide a new and improved phase shifting circuit for use in FM stereo receivers for shifting the phase of an oscillatory signal over a relatively wide range of phase angles with very little variation in the amplitude of such oscillatory signal.

It is a further object of the invention to provide a new and improved FM stereo receiver wherein the phase of the reinserted subcarrier carrier may be readily controlled from the front panel of the receiver.

In accordance with one feature of the invention, there is provided in an FM stereo receiver a phase shifting circuit comprising a parallel resonant tank circuit having an inductor in one branch and a capacitor in the other branch. This circuit also includes circuit means for supplying to the tank circuit a signal derived from the FM pilot signal having a frequency corresponding to the resonant frequency of the tank circuit. The circuit further includes a resistor and a second capacitor connected in series with one another, this series combination being connected between first and second spaced apart points on the inductor. The phase shifting circuit additionally includes FM receiver circuit means for utilizing the signal appearing between the junction of the resistor and the second capacitor and a point on the inductor intermediate the first and second points. In addition, either the resistor or the second capacitor includes means for varying the impedance value thereof for shifting the phase of the signal supplied to the utilizing circuit means relative to the phase of the input signal with a minimum of change in amplitude of the signal supplied to the utilizing circuit means.

For a better understanding of the present invention, together with other and further objects and features thereof, reference is had to the following description taken in connection with the accompanying drawing, the scope of the invention being pointed out in the appended claims.

Referring to the drawing:

FIG. 1 is a circuit diagram, partly schematic of an FM stereo receiver including a representative embodiment of a phase shifting circuit constructed in accordance with the present invention; and FIG. 2 is a vector diagram used in explaining the operation of the phase shifting circuit of FIG. 1.

Referring to FIGURE 1 of the drawing, there is shown a frequency-modulation (FM) stereo multiplex receiver for reproducing stereophonic sound from a received composite stereo multiplex signal including, among other things, a modulated subcarrier conveying audio information and a pilot signal conveying phasing information. The receiver includes an antenna system 10, 11 coupled to a radio-frequency (RF) amplifier 12 which, in turn, is coupled in cascade with a mixer 13, an intermediate-frequency (IF) amplifier 14 and an FM detector 15. A local oscillator 16 is coupled to the mixer 13 for reducing the received RF signal to the desired IF frequency. An AGC (automatic gain control) detector 17 is connected to the output of the IF amplifier 14 for developing a gain control voltage proportional to the level of the received carrier signal. This gain control signal is coupled back to the RF amplifier 12 and the IF amplifier 14 for purposes of maintaining the received signal at the output of the IF amplifier more nearly constant.

The detected modulation signal, which is of a composite nature, appearing at the output FM detector 15 is supplied by way of an emitter follower 19 and a normally-closed switch 20 to a multiplex converter system 21. The multiplex converter system 21 includes an emitter follower 22, a first synchronous detector 23 and a second synchronous detector 24. The multiplex converter 21 also includes a 19-kilocycle pilot signal amplifier 25, a phase shifting circuit 26, and a 38-kilocycle subcarrier oscillator 27. The 19-kilocycle pilot signal supplied by way of amplifier 25 and phase shifting circuit 26 to the subcarrier oscillator 27 is used to synchronize the phase of the 38-kilocycle subcarrier generated therein.

An in-phase or 0°-phase 38 kc. signal is supplied by the oscillator 27 to the synchronous detector 23. At the same time, a reverse-phase or 180°-phase 38 kc. signal is supplied by the oscillator 27 to the second synchronous detector 24. The synchronous detectors 23 and 24 serve to demodulate or detect the $L-R$ audio information conveyed by the subcarrier modulation components and to combine this detected information with the lower frequency $L+R$ audio information on which the subcarrier information is superimposed. The combining is performed in an additive manner in the synchronous detector 23 and in a subtractive manner in the synchronous detector 24. The resulting left channel audio signal appearing at the output of synchronous detector 23 is then supplied by way of an audio amplifier 28 to a loudspeaker 29. At the same time, the right channel audio signal at the output of synchronous detector 24 is supplied by way of an audio amplifier 30 to a second loudspeaker 31.

A subcarrier bandpass filter 32, which is located intermediate emitter followers 19 and 22, is tuned to the 38 kc. subcarrier frequency for passing only the subcarrier modulation components. This filter 32, which is inserted whenever the normally-closed switch 20 is opened, is used in conjunction with the phase shifting circuit 26 to enable the listener to accurately adjust the phase of the 38 kc. subcarrier carrier generated by the oscillator 27.

Considering now the details of the phase shifting circuit 26, such circuit includes an electron device in the form of an NPN silicon transistor 40 having a base electrode 41, an emitter electrode 42 and a collector electrode 43. The base electrode 41 is coupled to the output of the pilot signal amplifier 25 by way of an input coupling capacitor 44. A pair of resistors 45 and 46 are connected in series between a source of supply voltage +V and chassis ground with the junction between such resistors being connected to the base electrode 41. The voltage divider thus formed provides a bias voltage for the base electrode 41. The emitter electrode 42 of transistor 40 is connected to chassis ground by way of a resistor 47.

There is connected to the collector electrode 43 of transistor 40 a parallel resonant tank circuit 50 having an inductor 51 in one branch and a capacitor 52 in the other branch. This tank circuit 50 is proportioned to resonate at the 19 kc. pilot signal frequency. Inductor 51 is of the adjustable core type, adjustment of the core serving to tune the tank circuit 50 to precisely the 19 kc. frequency. Inductor 51 and capacitor 52 are also constructed so that the tank circuit 50 is of the high Q type.

Connected to the tank circuit 50 is a resistor 53 and a second capacitor 54 which are connected in series with one another. This series combination is connected between first and second spaced apart points A and C on the inductor 51. The resistor 53 is in the form of a potentiometer and the sliding tap 55 thereof is connected to the side of the potentiometer resistor 53 which is connected to point A on the inductor 51. Sliding top 55 provides a means for varying the impedance value of resistor 53. A point B on the inductor 51, which is intermediate the first and second points A and C, is connected to a source of supply voltage +V. This voltage +V is of fixed magnitude. Point C on the inductor 51 is also connected to the collector electrode 43 of transistor 40. Points A, B and C on the inductor 51 are selected so that the number of coil turns between points A and B is substantially equal to the number of coil turns between points B and C. The junction between variable resistor 53 and capacitor 54 is coupled to the synchronizing signal input of subcarrier oscillator 27 by way of an output coupling capacitor 56.

Considering now the operation of the phase shifting circuit 26, transistor 40 is biased to operate as an amplifier. Because of the presence of the tuned tank circuit 50 in the collector circuit of the transistor 40, this can be classed as a tuned amplifier circuit. The 19 kc. pilot signal supplied from the amplifier 25 to base electrode 41 is amplified by transistor 40 and the amplified signal is supplied to the tank circuit 50. Because of the equality of coil turns between points A and B and points B and C on the inductor 51, the 19 kc. voltage developed between points A and B is equal to the 19 kc. voltage developed between points B and C. Taken with respect to the center point B, which is a point of fixed reference potential, these two voltages are 180° out-of-phase with respect to one another.

These two out-of-phase voltages are added together by resistor 53 and capacitor 54. The resulting output voltage "$e_{out}$" appearing at the junction between resistor 53 and capacitor 54, taken with respect to the reference potential point B, is indicated in the vector diagram of FIGURE 2. It can be shown mathematically that the magnitude of the output voltage $e_{out}$ remains constant as the impedance value or resistance value of resistor 53 is varied. The phase of this output voltage, indicated by the phase angle $\phi$ in the vector diagram of FIG. 2, however, does not remain constant and, in fact, varies over a fairly wide range. In practice, it has been found that the phase angle can be shifted over a range of approximately 150° with the magnitude of the output voltage remaining fairly constant.

In the vector diagram of FIG. 2, "$i$" denotes the current flowing through resistor 53 and capacitor 54. R denotes the resistance value of resistor 53 and $X_c$ denotes the reactance value of capacitor 54. The vectors $\overline{BA}$ and $\overline{BC}$ represent the voltages across the corresponding portions of the inductor 51. The output signal $e_{out}$, which is supplied to the subcarrier oscillator 27 by way of the output coupling capacitor 56, is the signal appearing between the junction of resistor 53 and capacitor 54 and the point B on inductor 51, such point being connected to chassis ground by way of the voltage source +V.

For the design constants given hereinafter, the reactance of capacitor 54 is approximately 12,000 ohms at the frequency of 19 kilocycles. At the same time, the resistor 53 is provided with a maximum resistance of 10,000 ohms, such resistance being variable to a value of zero ohms by movement of sliding tap 55.

Unfortunately the phase shift $\phi$ for the output signal $e_{out}$ is not a linear function of the resistance value of resistor 53. In the present embodiment, this nonlinearity is eliminated by using a so-called "tapered potentiometer" for the potentiometer 53. In other words, the potentiometer 53 is constructed so that the resistance thereof is a nonlinear function of the position of the sliding tap 55 and this nonlinearity is selected to offset, as near as possible, the nonlinear relationship between the phase angle and the resistance value. In the present embodiment, the position of sliding tap 55 is controlled by a control knob located on the front panel of the receiver.

In order to provide the proper phase adjustment, the receiver of FIG. 1 is tuned to a desired FM station. Switch 20 is then opened. This places the 38 kc. bandpass filter 32 in series between emitter followers 19 and 22. This allows only the 38 kc. subcarrier channel to pass on through to the synchronous detectors 23 and 24. The sliding tap 55 on potentiometer resistor 53 is then adjusted until maximum output level is obtained from the loudspeakers 29 and 31. This indicates that the 38 kc. reinserted subcarrier has the optimum phase relative to the received subcarrier modulation components. After this adjustment is completed, switch 20 is returned to a closed condition and the receiver operates in a normal manner to reproduce the stereophonic sound program. Switch 20 may be combined with potentiometer 53 so that both are controlled by the same front panel control knob, switch 20 being actuated by pulling or pushing the control knob and potentiometer 53 being actuated by rotating the control knob.

While it is not intended to limit the invention to any particular design constants, the following values have been found suitable for the embodiment illustrated in the drawing:

| | | |
|---|---|---|
| Capacitor **44** | microfarads | 0.01 |
| Capacitor **52** | do | 0.01 |
| Capacitor **54** | micromicrofarads | 680 |
| Capacitor **56** | microfarads | 0.01 |
| Resistor **45** | ohms | 150,000 |
| Resistor **46** | do | 22,000 |
| Resistor **47** | do | 330 |
| Resistor **53** | do | 0 to 10,000 |
| Transistor **40** | | 2N2712 |
| Voltage +V | volts | 9.1 |

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a frequency-modulation stereo multiplex receiver wherein stereophonic sound is reproduced in response to a received composite stereo multiplex signal including a modulated subcarrier conveying audio information and a pilot signal conveying phasing information, the combination comprising: means for receiving the composite stereo multiplex signal; means coupled to the receiving means for generating reference oscillations having a frequency substantially equal to the center frequency of the subcarrier; demodulating means coupled to the receiving means for recovering the audio information from the modulated subcarrier in response to the application thereto of the reference oscillations; the reference oscillation generating means including a parallel resonant inductor-capacitor tank circuit responsive to a signal derived from the pilot signal and tuned to a frequency of N times F, where N is an integer and F is the pilot signal frequency, a resistor and a second capacitor connected in series with one another, this series combination being connected between first and second spaced apart points on the tank circuit inductor, circuit means responsive to the signal appearing between the junction of the resistor and the second capacitor and a point on the tank circuit inductor intermediate the first and second points for developing the reference oscillations supplied to the demodulating means, and means for varying the impedance value of one of the resistor and the second capacitor for shifting the phase of the reference oscillations.

2. In a frequency-modulation stereo multiplex receiver wherein stereophonic sound is reproduced in response to a received composite stereo multiplex signal including a modulated subcarrier conveying audio information and a pilot signal conveying phasing information, the combination comprising: means for receiving the composite stereo multiplex signal; signal generator circuit means for generating reference oscillations having a frequency substantially equal to the center frequency of the subcarrier; demodulating means coupled to the receiving means for recovering the audio information from the modulated subcarrier in response to the application thereto of the reference oscillations; and phase shifting circuit means including a parallel resonant inductor-capacitor tank circuit responsive to the pilot signal and tuned to the pilat signal frequency, a resistor and a second capacitor connected in series with one another, this series combination being connected between first and second spaced apart points on the tank circuit inductor, circuit means for supplying the signal appearing between the junction of the resistor and the second capacitor and a point on the tank circuit inductor intermediate the first and second points to the signal generator circuit means for synchronizing the reference oscillations generated therein, and means for varying the impedance value of one of the resistor and the second capacitor for shifting the phase of the reference oscillations.

3. In a frequency-modulation stereo multiplex receiver wherein a pair of binaural sound signals are reproduced in response to a received composite stereo multiplex signal including primary audio components, subcarcier modulation audio components and a pilot signal component conveying phasing information, the combination comprising:

input circuit means for receiving the composite stereo multiplex signal;

demultiplexing circuit means for reconstructing the two binaural signals from the composite signal;

first and second loudspeaker means individually responsive to different ones of the reconstructed binaural signals for producing corresponding sets of sound waves;

coupling circuit means for supplying the audio components of the received composite signal to the demultiplexing circuit means, such coupling circuit means including selectively operative filter circuit means effective, when operative, to supply only the subcarrier modulation audio components to the demultiplexing circuit means;

signal producing circuit means responsive to the pilot signal component of the received signal for producing and supplying to the demultiplexing circuit means reference oscillations having a frequency substantially equal to the center frequency of the subcarrier, such signal producing circuit means including adjustable phase shifting circuit means for shifting the phase of the reference oscillations supplied to the demultiplexing circuit means;

and means for rendering the filter circuit means operative when it is desired to adjust the phase shifting circuit means for optimum reproduction of the two binaural signals, the proper adjustment being obtained by adjusting the phase shifting circuit means until maximum output is obtained from the loudspeaker means with the filter circuit means operative.

References Cited

UNITED STATES PATENTS

| | | | |
|---|---|---|---|
| 3,102,167 | 8/1963 | Barton | 179—15 |
| 3,242,264 | 3/1966 | De Vries | 179—15 |

DAVID G. REDINBAUGH, *Primary Examiner.*

ROBERT L. GRIFFIN, *Examiner.*